Sept. 4, 1923.  1,466,956
G. T. PETERS
METHOD OF AND APPARATUS FOR SUPPLYING WATER TO IRRIGATION DITCHES
Filed Nov. 8, 1922
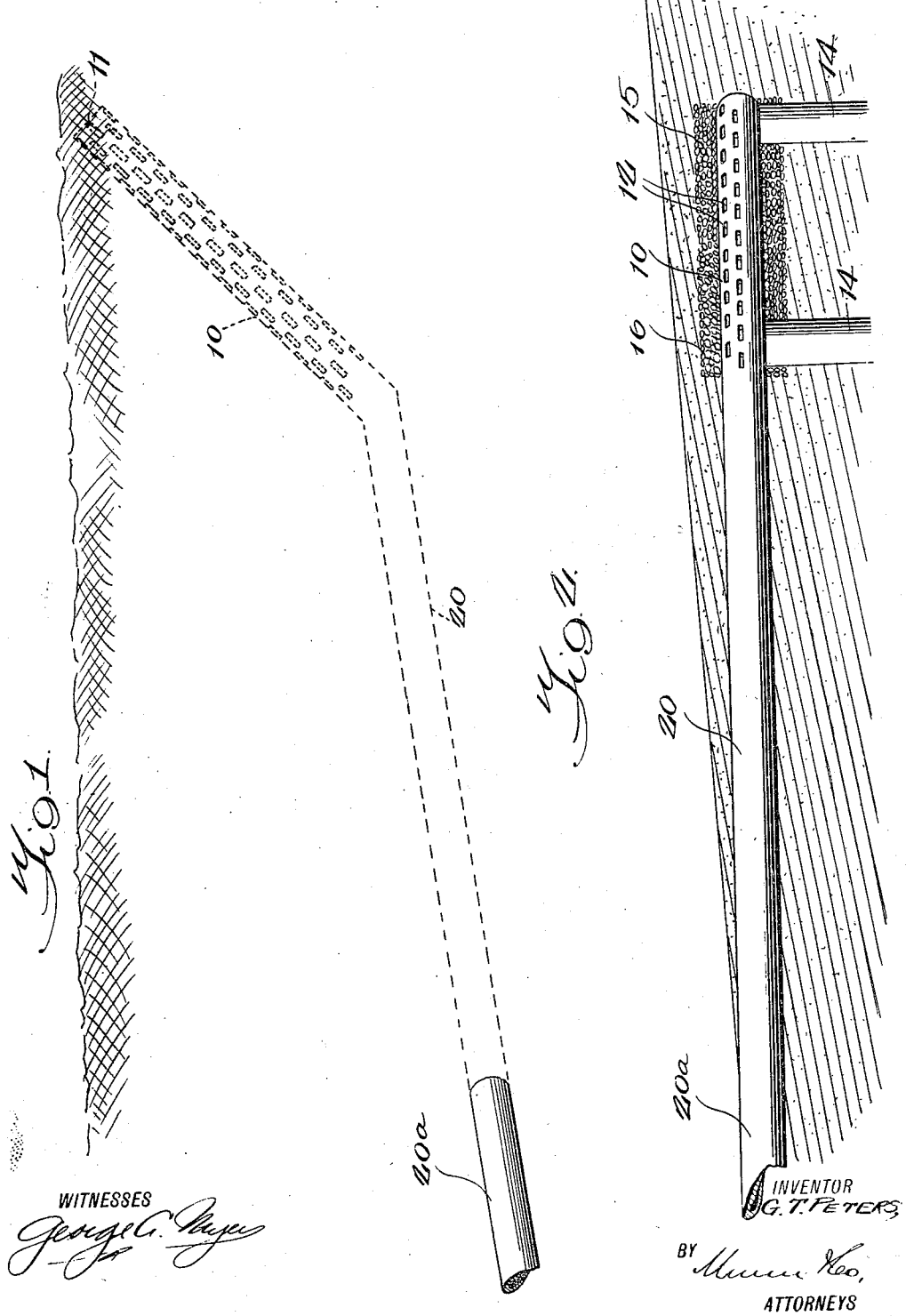

Patented Sept. 4, 1923.

1,466,956

UNITED STATES PATENT OFFICE.

GEORGE THOMAS PETERS, OF COLUMBUS, NEW MEXICO.

METHOD OF AND APPARATUS FOR SUPPLYING WATER TO IRRIGATION DITCHES.

Application filed November 8, 1922. Serial No. 599,724.

*To all whom it may concern:*

Be it known that I, GEORGE T. PETERS, a citizen of the United States, and a resident of Columbus, in the county of Luna and State of New Mexico, have invented certain new and useful Improvements in Methods of and Apparatus for Supplying Water to Irrigation Ditches, of which the following is a specification.

This invention relates to a method of and apparatus for supplying water to irrigation ditches or the like, and the object of the invention is to provide a method and apparatus of this character whereby an adequate and uniform supply of water may be had at all times and irrespective of flood or drought, the invention being at the same time reliable and comparatively inexpensive in its practical embodiment.

Other objects and advantages of the invention reside in certain novel features of the construction, combination and arrangement of parts which will be hereinafter more fully described and particularly pointed out in the appended claim, reference being had to the accompanying drawings forming part of this specification, and in which:

Figure 1 is a fragmentary view in plan, showing a portion of the river bed with which the present invention is associated; and Figure 2 is a view similar to Figure 1, showing the river bed in vertical section, other parts being shown in elevation for the sake of illustration.

In certain sections of the country where irrigation is essential to agriculture, the rivers run dry when there is the greatest need of water for irrigation purposes. To overcome these difficulties it has been the practice to build dams in order that the water may be diverted and reserved during the flood times. In many localities the bed rock is so far below the surface of the river bed that as a practical matter only brush dams may be constructed and very frequently these brush dams are washed away during flood times so that the water which should at such times be reserved is lost. The conditions referred to obtained in those sections of the country where the Gila, Little Colorado and the Arkansas rivers flow. In such sections however I have discovered that the sand which in part makes up the bed of the river always contains a great quantity of water even during the driest spells. In fact water bearing sand usually reaches from mountain to mountain under the valley that is farmed and thus constitutes a great reservoir for water.

In its broadest aspects the present invention comprises a method of supplying water for irrigation purposes which consists in extracting the water from the water bearing sand lying in or below the river bed and conducting the water so extracted to the irrigation ditches. Preferably, the second step in the method resides in the manner in which the water is conducted to the irrigation ditch after it is extracted from the water bearing sand of the river bed and such second step consists in conveying the water so extracted to the irrigation ditch by gravity.

Referring to the drawings wherein for the sake of illustration is shown the preferred embodiment of the apparatus for carrying out the method, the numeral 10 designates an improved flood-proof ditch head comprising a section of a pipe or conduit which may be constructed of wood, concrete or steel and which is sunk or buried in the river bed for a substantial distance, usually for a distance of from four to eight feet. This ditch head is closed at its outer end, as at 11, and its peripheral surface is provided with a multiplicity of perforations 12 through which the water flows from the sand into the head. In order to preclude the possibility of the ditch head being shifted during flood time it is suitably secured by clamps, bolts or the like to piling 14 driven down into the bed of the river. The ditch head is packed in gravel, preferably two strata of gravel being provided, one stratum being made up of large gravel 15 which is packed around the head 10, and an outer stratum 16 which is packed around the inner stratum, the outer stratum being made up of small gravel. In this manner the water may flow freely into the ditch head while sand or the like is excluded therefrom. The length of the ditch head varies with different installation and usually is from fifty feet to fifty yards in length. It is laid in the river bed on the desired gradient usually on a grade of one-quarter inch of a rod although in some instances a fall of two feet to the mile in the ditch head has been found to give good results. It is to be understood that the ditch head is buried in that portion of the river bed which lies in the channel of the river and it extends obliquely across the channel of the river below the bed. At the point where the ditch head leads out of the channel it communicates with a conduit 20 which is also buried in the river bed and extends down the stream and at an angle to the stream so that it eventually will lead into the river bank. The conduit 20 usually has a fall of one-fourth or one-half inch to the rod. As the fall of the river is usually about ten feet to the mile the pipe or conduit 20 eventually rises above the river bed as indicated at 20ª in the drawings. The pipe 20 ultimately leads into the irrigation ditch which is to be supplied with water.

With this apparatus the ditch head extracts the water from the water bearing sand contained in and below river bed and the water thus taken into the ditch head flows by gravity through the pipe 20 to the irrigation ditch to be supplied with water. The supply of water is uniform irrespective of whether flood or drought conditions prevail and since the ditch head is buried a substantial distance in the river bed it is not liable to be injured or have its efficiency impaired by the action of the flood. Since the ditch head is packed in gravel the water delivered to the irrigation ditch is free of sand or other foreign matter.

I claim:

An apparatus of the character described comprising a ditch head consisting of a perforated pipe having its end closed, said ditch head being located in the water bearing sand of the river bed, a piling driven in the river bed and connected with the perforated pipe for holding the same in position, a packing of gravel extending around the perforated pipe, said perforated pipe being arranged on a gradient in said river bed, and a conduit leading from the perforated pipe to the irrigation ditch to be supplied with water, said conduit having an inclination sufficient to conduct the water from the ditch head to the irrigation ditch.

GEORGE THOMAS PETERS.